(12) United States Patent
Swift et al.

(10) Patent No.: US 6,736,745 B1
(45) Date of Patent: May 18, 2004

(54) SEAMED BELT HAVING BEVELED END SECTIONS

(75) Inventors: Joseph A. Swift, Ontario, NY (US); T. Edwin Freeman, Webster, NY (US); Theodore Lovallo, Williamson, NY (US); Edward L. Schlueter, Jr., Rochester, NY (US); Constance J. Thornton, Ontario, NY (US); Xiaoying Elizabeth Yuan, Fairport, NY (US); Santokh S Badesha, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 180 days.

(21) Appl. No.: 09/675,189

(22) Filed: Sep. 29, 2000

(51) Int. Cl.⁷ .............................. F16G 3/10; B32B 3/02; G03G 15/00
(52) U.S. Cl. .................... 474/253; 399/162; 428/58
(58) Field of Search ................ 474/253, 250, 474/252, 254; 428/58, 192; 399/130, 298, 343, 162, 67, 88, 302, 308; 219/121.68, 121.69, 121.73; 156/74, 304.2

(56) References Cited

U.S. PATENT DOCUMENTS

| 4,038,879 A | * | 8/1977 | Courtney | 474/154 |
|---|---|---|---|---|
| 5,487,707 A | | 1/1996 | Sharf et al. | 474/253 |
| 5,514,436 A | | 5/1996 | Schlueter, Jr. et al. | 428/57 |
| 5,549,193 A | | 8/1996 | Schlueter, Jr. et al. | 198/844.2 |
| 5,721,032 A | | 2/1998 | Parker et al. | 428/57 |
| 5,744,780 A | * | 4/1998 | Chang et al. | 219/121.73 |
| 5,761,579 A | * | 6/1998 | Folkins | 399/130 |
| 5,997,974 A | * | 12/1999 | Schlueter, Jr. et al. | 474/253 X |
| 6,002,902 A | * | 12/1999 | Thornton et al. | 474/253 X |
| 6,129,347 A | * | 10/2000 | Brooks et al. | 271/22 |
| 6,261,659 B1 | * | 7/2001 | Fletcher et al. | 474/253 X |
| 6,311,036 B1 | * | 10/2001 | Jia et al. | 474/353 X |
| 6,317,571 B1 | * | 11/2001 | Adams | 399/67 |
| 6,387,199 B1 | * | 5/2002 | DeCrescentis et al. | 156/74 |

FOREIGN PATENT DOCUMENTS

DE    3340432 A1 * 5/1985

* cited by examiner

*Primary Examiner*—Marcus Charles
(74) *Attorney, Agent, or Firm*—John M Kelly; Joseph M. Young

(57) ABSTRACT

Seamed belts, particularly puzzle-cut imageable seam intermediate transfer belts, and marking machines that use such belts, that have a beveled sides across the thickness of the belt. When the first and second ends are interlocked the bevel points are adjacent one another and a substantially V-shaped channel is formed. An adhesive is disposed in that channel. The V-shaped channel beneficially continuously extends along the puzzle-cut seam.

16 Claims, 8 Drawing Sheets

SEAMED BELT HAVING BEVELED END SECTIONS

FIELD OF THE INVENTION

This invention relates to electrophotographic printing machines having seamed intermediate transfer belts.

BACKGROUND OF THE INVENTION

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated for a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from the belts as required to fulfill the requirements of the machine's overall architecture.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is long. While seamed intermediate transfer belts are relatively low in cost, the seam introduces a discontinuity that interferes with the electrical, thermal, and mechanical properties of the belt. While it is possible to synchronize a printer's operation with the motion of the intermediate transfer belt so that toner is not electrostatically transferred onto the seam, such synchronization adds to the printer's expense and complexity, resulting in loss of productivity. Additionally, since high speed electrophotographic printers typically produce images on paper sheets that are cut from a paper "web," if the seam is avoided the resulting unused portion of the paper web must be cut-out, producing waste. Furthermore, even with synchronization the mechanical problems related to the discontinuity, such as excessive cleaner wear and mechanical vibrations, still exist. However, because of the numerous difficulties with transferring toner onto and off of a seamed intermediate transfer belt in the prior art it was necessary, to avoid toner transfer onto (and thus off of) a seam.

Acceptable intermediate transfer belts require sufficient seam strength to achieve a desired operating life. While that life depends on the specific application, typically it will be at least 100,000 operating cycles, but more preferably 1,000,000 cycles. Considering that a seamed intermediate transfer belt suffers mechanical stresses from belt tension, traveling over rollers, moving through transfer nips, and passing through cleaning systems, achieving such a long operating life is not trivial. Thus the conflicting constraints of long life and limited topographical size at the seam places a premium on adhesive strength and good seam construction.

A prior art "puzzle-cut" approach to seamed belts significantly improves the seam's mechanical strength. U.S. Pat. No. 5,514,436, issued May 7, 1996, entitled "Puzzle Cut Seamed Belt;" U.S. Pat. No. 5,549,193, entitled "Endless Seamed Belt with Low Thickness Differential Between the Seam and the Rest of the Belt;" and U.S. Pat. No. 5,487,707, issued Jan. 30, 1996, entitled "Puzzle Cut Seamed Belt With Bonding Between Adjacent Surface By UV Cured Adhesive" teach the puzzle-cut approach. With puzzle-cuts, interlocking tabs are used to improve the seam's strength. However, even further improvements would be beneficial. Furthermore, there are other difficulties when imaging in the seam area or when transferring toner onto and off of a seam of a seamed intermediate transfer belt.

For a seamed intermediate transfer belt to be acceptable, the final image produced from across the seam must be comparable in quality to images formed across the remainder of the belt. This is a difficult task due to a number of interrelated factors. Some of those factors relate to the fact that the seam should not greatly impact the electrostatic fields used to transfer toner. However, electrostatic transfer fields are themselves dependent on the electrical properties of the intermediate transfer belt. While this dependency is complex, briefly there are conditions where transfer fields are very sensitive to the resistivity and thickness of the materials used for the various layers of the intermediate transfer belt. Under other conditions the electrostatic transfer fields are relatively insensitive to those factors. Similarly, there are conditions where the electrostatic transfer fields are very sensitive to the dielectric constants of the materials used for the layers of the intermediate transfer belt, and other conditions where the electrostatic transfer fields are insensitive to the dielectric constants. Therefore, to successfully transfer toner onto and off of a seamed intermediate transfer belt the electrical properties across and around the seam should be carefully controlled to produce a proper relationship with the remainder of the belt. Since the electrical properties depend on the interrelated factors of seam geometry, seam construction (such as adhesive beyond the seam), seam topology, seam thickness, the presence of an overcoating, and various other factors those factors should be taken into consideration for a given application.

In addition to mechanical strength and electrical compatibility difficulties, there are other problems when transferring toner onto and off of a seam. For example, with most prior art seamed intermediate transfer belts relatively poor cleaning around the seam was acceptable. However, if toner is being transferred onto and off of the seam region the seam must be properly cleaned. Thus, the toner release and friction properties across the seam region have to be comparable to those of the rest of the belt. Furthermore, most prior art seamed intermediate transfer belts have a significant "step" where the belt overlaps to form the seam. That step can be as large as 25 microns. Such a step significantly interferes with transfer and cleaning. Thus if toner is transferred onto and off of the seam, the seam's friction, toner release, and topography are much more constrained than those of other seamed intermediate transfer belts.

From above it can be seen that a seam's topography is very important if one wants to transfer toner onto and off of a seam region without significant degradation of the final image. The seam topography includes not only the seam itself, but also any overflow of the adhesive used in the seam. This overflow can occur on both the toner-bearing side and the backside of the belt. Adhesive overflow is important because the belt seam strength can depend on that overflow. However, excessive overflow increases various mechanical, electrical, and xerographic problems. Furthermore, the adhesive's electrical properties remain important.

More information regarding the requirements of imageable seam intermediate transfer belts can be found in U.S. patent application Ser. No. 09/460,896, entitled "Imageable Seam Intermediate Transfer Belt Having An Overcoat," by Edward L. Schlueter, Jr. et al., and U.S. patent application Ser. No. 09/460,821, entitled "Imageable Seam Intermediate Transfer Belt," by Gerald M. Fletcher et al., both filed on Dec. 14, 1999. Those patent documents discuss, among other things, "short-wavelength" and "long-wavelength" spatial disturbances, conformable overcoats, Paschen air breakdown, transfer nip air gaps, suitable electrical properties, material layers, material compositions, environmental and aging concerns, cleaning, surface friction, and "set point control" approaches to enable wider tolerances in electrical properties.

The present invention is specifically related to a technique of improving a seam's electrical and strength properties without significantly degrading other desirable imageable seam intermediate transfer belt properties. As previously indicated, prior art puzzle-cut seams are useful in achieving a strong belt seam. At least part of this strength is due to an increased seam surface area and at least part is due to an improved distribution of lateral forces. However, prior art puzzle-cut seams might not be optimal in particular applications. For example, when particularly rugged belts are required a further increase in belt seam surface area would be beneficial. Additionally, the electrical properties of imageable seam intermediate transfer belts at and near the kerfs are particularly difficult to control. So much so that, in general, the smaller the kerf the better the electrical performance of imageable seam intermediate transfer belts. Therefore, a puzzle-cut seam having an increased surface area would be beneficial. Even more beneficial would be a puzzle-cut seam having an increased surface area but a small kerf.

SUMMARY OF THE INVENTION

The principles of the present invention provide for seamed belts, particularly puzzle-cut imageable seam intermediate transfer belts, that have a relatively large seam surface areas and relatively small kerfs. The principles of the present invention further provide for marking machines that use imageable seam intermediate transfer belts that have relatively large seam surface areas and relatively small kerfs.

A belt according to the present invention includes a substrate having a puzzle-cut first end and a puzzle-cut second end that are beveled along the thickness of the belt. When the first and second ends are interlocked the bevel points are adjacent one another and a substantially V-shaped channel is formed. An adhesive is disposed in that channel. The V-shaped channel beneficially continuously extends along the puzzle-cut seam.

An imageable seam intermediate transfer belt according to the present invention includes a seamed semiconductive substrate having a puzzle-cut first end and a puzzle-cut second end that are beveled along the thickness of the belt. When the first and second ends are interlocked the bevel points are adjacent on another and a V-shaped channel is formed. An adhesive is disposed in that channel. The V-shaped channel beneficially continuously extends along the puzzle-cut seam.

A marking machine according to the present invention includes a moving photoreceptor belt, a charging station for charging that belt, an imaging station for exposing the charged belt to produce a latent image, a developer for depositing toner on the latent image, and a transfer station for transferring deposited toner from the latent image to a fuser. The transfer station includes an intermediate transfer belt that receives toner from the latent image and transfers that toner to the toner transfix component. The fuser fuses the received toner to a substrate. Furthermore, a cleaning station cleans the photoreceptor. The intermediate transfer belt includes a seamed semiconductive substrate having a puzzle-cut first end and a puzzle-cut second end that are beveled along the thickness of the belt. When the first and second ends are interlocked the bevel points are adjacent on another and a V-shaped channel is formed. An adhesive is disposed in that channel. The V-shaped channel beneficially continuously extends along the puzzle-cut seam.

BRIEF DESCRIPTION OF THE DRAWINGS

Other features of the present invention will become apparent as the following description proceeds and upon reference to the drawings, in which.

DETAILED DESCRIPTION OF THE INVENTION

While the principles of the present invention are described below in connection with an embodiment of an imageable seam intermediate transfer belt and with an embodiment of an electrophotographic marking machine that uses that imageable seam intermediate transfer belt, it should be understood that the present invention is not limited to either of those embodiments. On the contrary, the present invention is intended to cover all alternatives, modifications, and equivalents as may be included within the spirit and scope of the appended claims.

Figure 1:
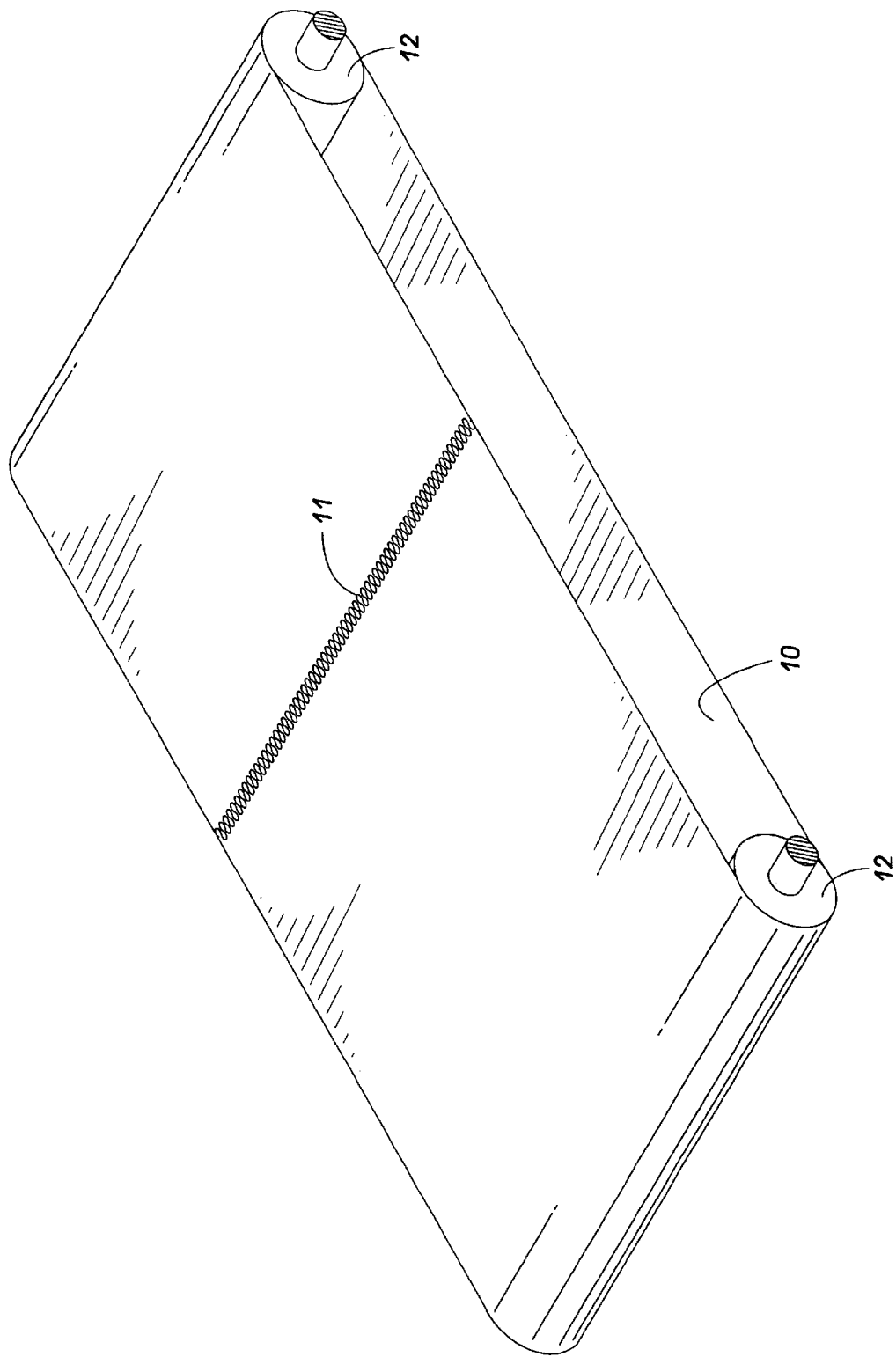
FIG. 1 is an isometric representation of a puzzle-cut seamed intermediate transfer belt.

An imageable seam intermediate transfer belt is illustrated in FIG. 1. That belt includes a semiconductive substrate layer 10 that has its ends joined together to form a continuous belt using mechanically interlocking "puzzle-cut" tabs that form a seam 11. While the seam is illustrated as being perpendicular to the two parallel sides of the substrate layer the seam could be angled or slanted with respect to the parallel sides. Reference U.S. Pat. Nos. 5,487,707; 5,514,436; 5,549,193; and 5,721,032 for additional information on puzzle-cut patterns. Typically the seam 11 is about ¼ inch wide.

The substrate layer 10 can be made from a number of different materials, including polyesters, polyurethanes, polyimides, polyvinyl chlorides, polyolefins (such as polyethylene and polypropylene) and/or polyamides (such as nylon), polycarbonates, or acrylics, or blends or aloys of such materials. If required, the selected material is modified by the addition of an appropriate filler such that the substrate layer has a desired electrical conductivity. Appropriate fillers can include for example carbon, Accufluor® fluorinated carbon black, and/or polyanaline, polythiophene or other conductive fillers or polymers. Donor salts can also be used. The substrate layer material should have the physical characteristics appropriate to an intermediate transfer application, including good tensile strength (Young's modulus, typically $1\times10^3$ to $1\times10^6$ Newton's/m$^2$, resistivity (typically less than $10^{13}$ ohm cm volume resistivity, greater than $10^8$ ohms/square lateral resistivity), thermal conductivity, thermal stability, flex strength, and high temperature longevity. See the previously referenced U.S. patent applications Ser. No. 09/460,896, entitled "Imageable Seam Intermediate Transfer Belt Having An Overcoat," by Edward L. Schlueter, Jr. et al., and Ser. No. 09/460,821 entitled "Imageable Seam Intermediate Transfer Belt," by Gerald M. Fletcher et al., both filed on Dec. 14, 1999.

Figure 2:
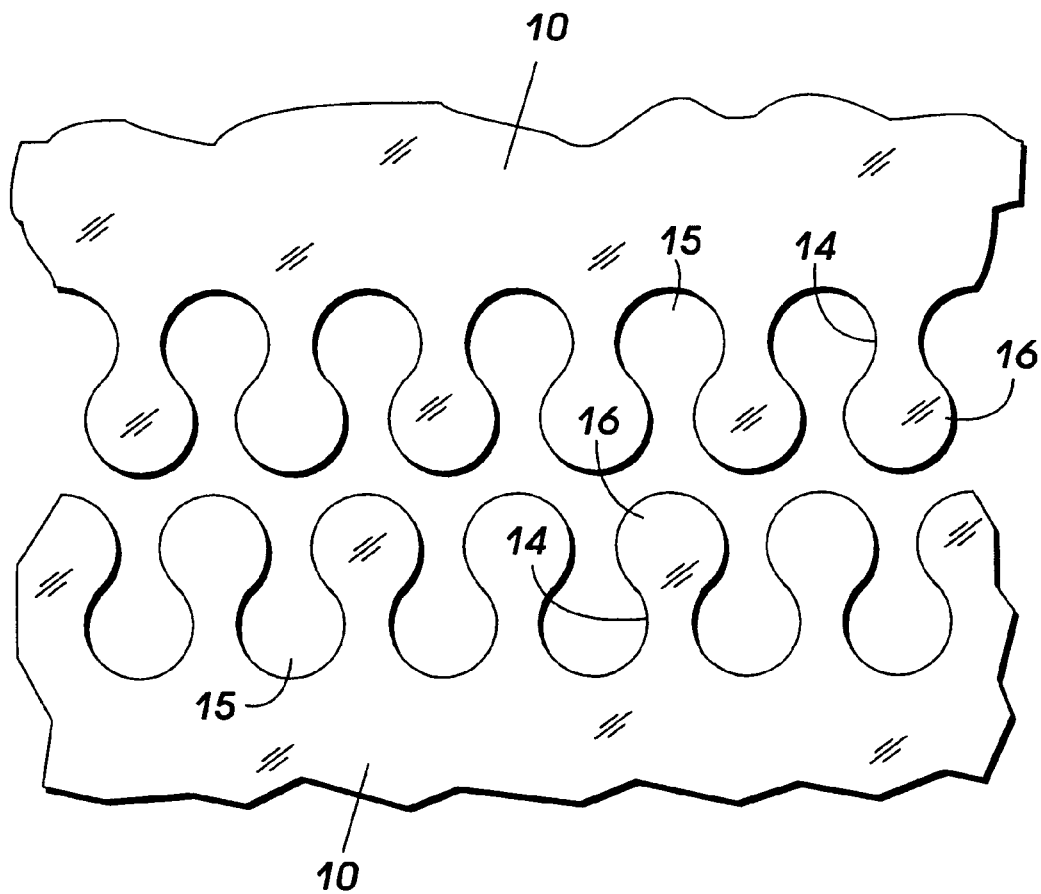
FIG. 2 is a top down view of the puzzle-cut tab pattern used in the belt of FIG. 1.

FIG. 2 shows a top view of a puzzle-cut tab pattern in more detail. Each tab is comprised of a neck 14 and a node 16 that fit into female 15 interlocking portions. The tabs can be formed using any conventional shaping technique, such as die cutting, laser cutting, specifically by using the laser micro-machining system described subsequently, or cutting wheel. The interlocking tab matings fit to reduce the stress concentration between the interlocking elements and to permit easy travel around curved members, such as rollers 12 shown in FIG. 1.

Figure 3:
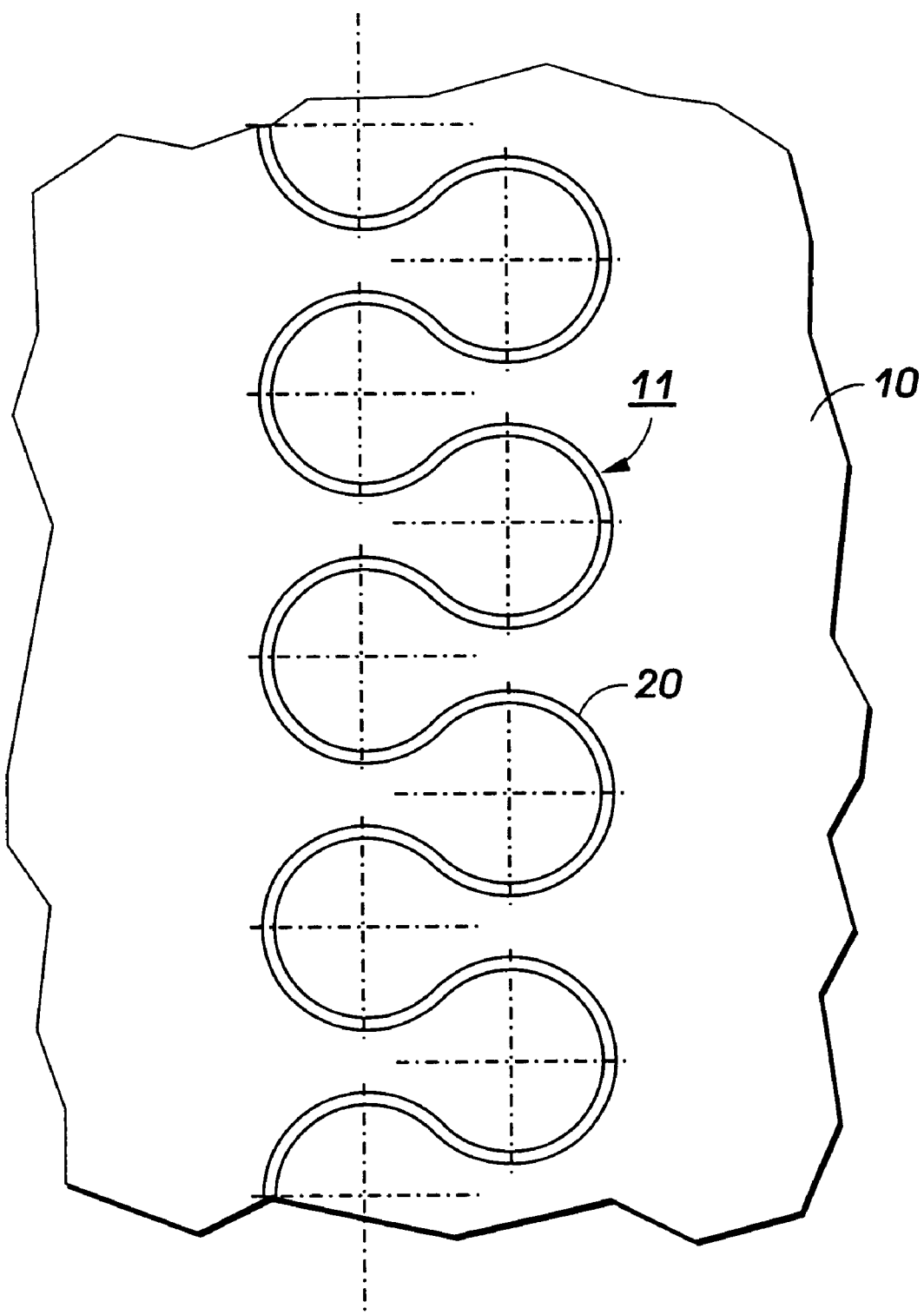
FIG. 3 shows the puzzle-cut tabs of FIG. 2 interlocked together.
Figure 4:
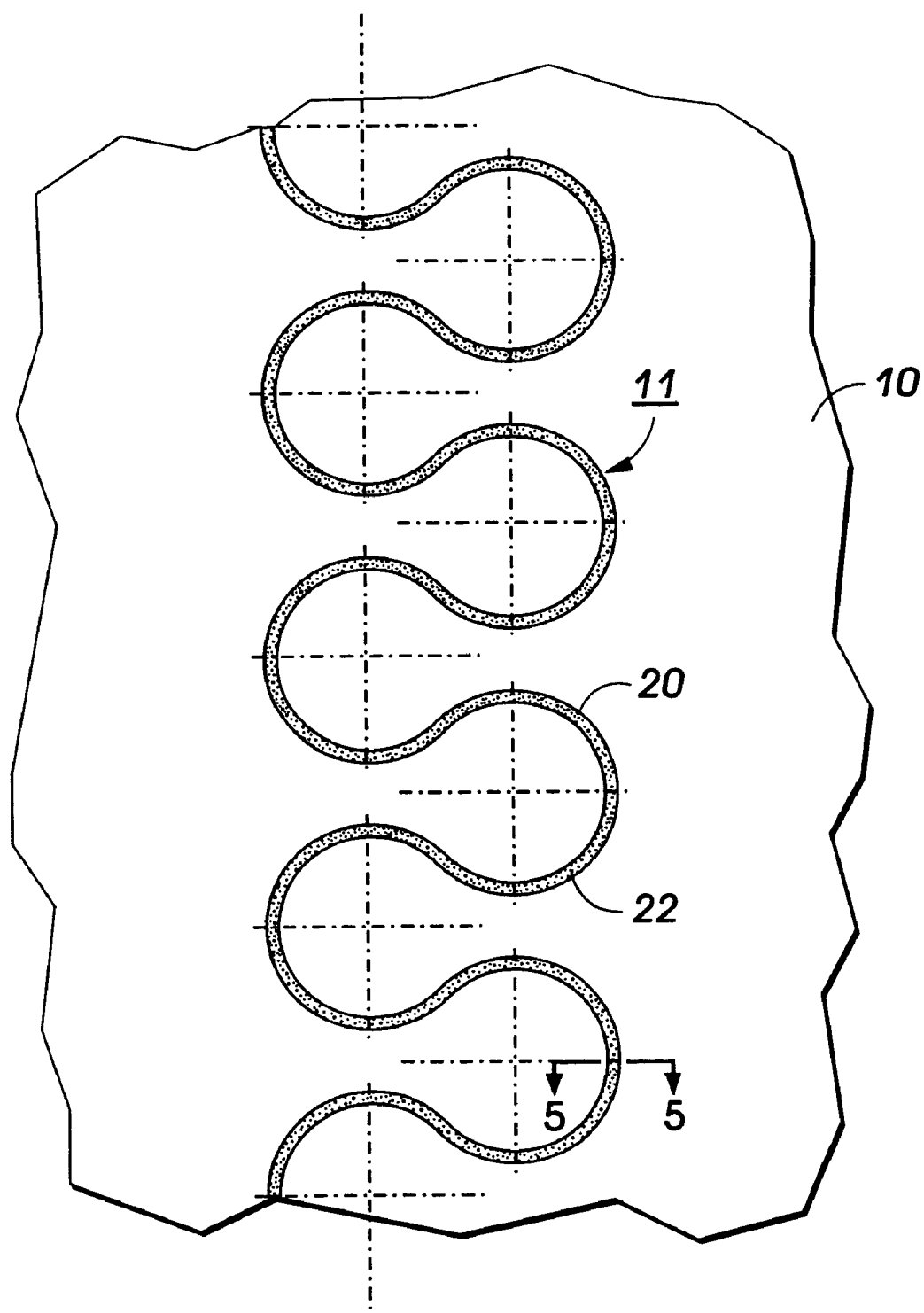
FIG. 4 shows the puzzle-cut tabs of FIG. 3 with the kerf filled with an adhesive.

FIG. 3 shows a top view of the puzzle-cut tabs of FIG. 2 interlocked together. Physically interlocking the puzzle-cut tabs may require pressure when mating the tabs. Interlocking produces a small gap between the mutually mating elements that is called a kerf 20. As shown in FIG. 4 the interlocking tabs are held together using an adhesive 22 that fills the kerf. The adhesive is designed to be physically, chemically, thermally, mechanically, and electrically compatible with the substrate layer material. Seams with a 25 micron kerf are typical for prior-art puzzle-cut seams, while a kerf less than about 5 microns is preferred.

Significantly, the adhesive and the puzzle-cut tabs act together to create a strong seam. Ideally the seam should be strong, smooth, and mechanically uniform. Belts according to the principles of the present invention differ from those of the prior art by adding a seam structure along a third dimension, that dimension being perpendicular to the seam planes in FIGS. 1–4. It should be understood that the seam structure beneficially extends along the seam, and that the adhesive 22 is disposed both in the kerf and across the seam structure. To that end, the adhesive should have a viscosity such that it readily wicks into the kerf. Additionally, the surface energy of the adhesive should be compatible with the substrate layer material such that the adhesive adequately wets and spreads. Furthermore, the adhesive should remain flexible and should adhere well to the substrate layer material. Finally, the adhesive also should have low shrinkage during curing. As an example, the adhesive can be a hot melt adhesive that is heated and pressed into the seam such that the adhesive is flattened, making it as mechanically uniform as possible with the substrate layer 10. Alternatively, the adhesive can be an epoxy-like material, a UV curable adhesives including acrylic epoxies, polyvinyl butyrals, or the like. Further, the "adhesive" can be substantially the substrate material itself, either applied during a separate adhesive application step or else by melting the two ends sufficiently to cause adhesion of the mutually mating elements. Finally, the adhesives may be electrically modified as required for the particular application. Following the application of the adhesive the seam 11 can be finished by buffing, sanding, or micro polishing to achieve a smooth topography.

The relative electrical properties of the adhesive and the substrate are very important because they significantly affect the transfer characteristics of the resulting seam as compared to the transfer characteristics of the rest of the belt. Therefore, the adhesive should produce a seam that has electrical properties that corresponds to that of the substrate layer. That is, under operating conditions a seam should create an electrostatic transfer field in the toner transfer zones that is within at least 20%, preferably within 10%, of the electrostatic transfer field that is present for the remainder of the belt. Ideally the seam's electrical properties are substantially the same as the substrate layer and have substantially the same electrical property dependence as the substrate on all important factors, such environment, applied field, and aging. However, significant differences in electrical properties can be allowed for some imageable seam conditions as discussed subsequently. The adhesive electrical properties can be met by mixing fillers or additives with an adhesive. For example, an adhesive might contain silver, indium tin oxide, CuI, SnO2, TCNQ, Quinoline, carbon black, NiO and/or ionic complexes such as quaternary ammonium salts, metal oxides, graphite, or like conductive fillers and conductive polymers such as polyanaline and polythiophenes.

Figure 5:
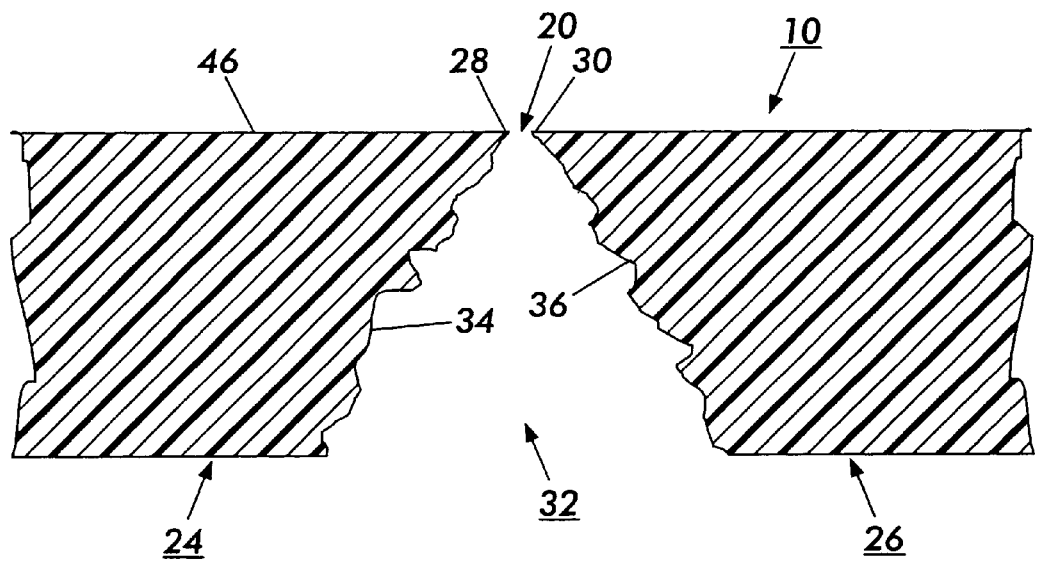
FIG. 5 shows a perspective view of a three-dimensional puzzle-cut seam structure having beveled edges that define a V-shaped channel without adhesive.

FIG. 5 shows the third-dimension seam structure of a belt according to the principles of the present invention. As shown, the ends 24 and 26 of the substrate layer 10 are beveled such that the end bevel points 28 and 30 are in a common plane and such that a V-shaped channel 32 is formed. That channel beneficially continuously extends along the seam 11. As shown in the FIG. 5, the sides 34 and 36 of the ends 24 and 26, respectively, are not smooth. Prior art imageable seam intermediate transfer belts had ends that were generally cut perpendicular to the surface 46 of the substrate layer 10. However, the resulting sides were not smooth because points and rough spots were unavoidable. The result was that the minimum kerf width depended on the roughness along the sides. However, by beveling the sides 34 and 36 the features that tend to control the minimum kerf width are the relatively sharp points 28 and 30. Therefore, the principles of the present invention can enable belts having reduced kerf widths. This is important because a narrower kerf tends to improve the electrical characteristics of imageable seam intermediate transfer belts.

Figure 6:
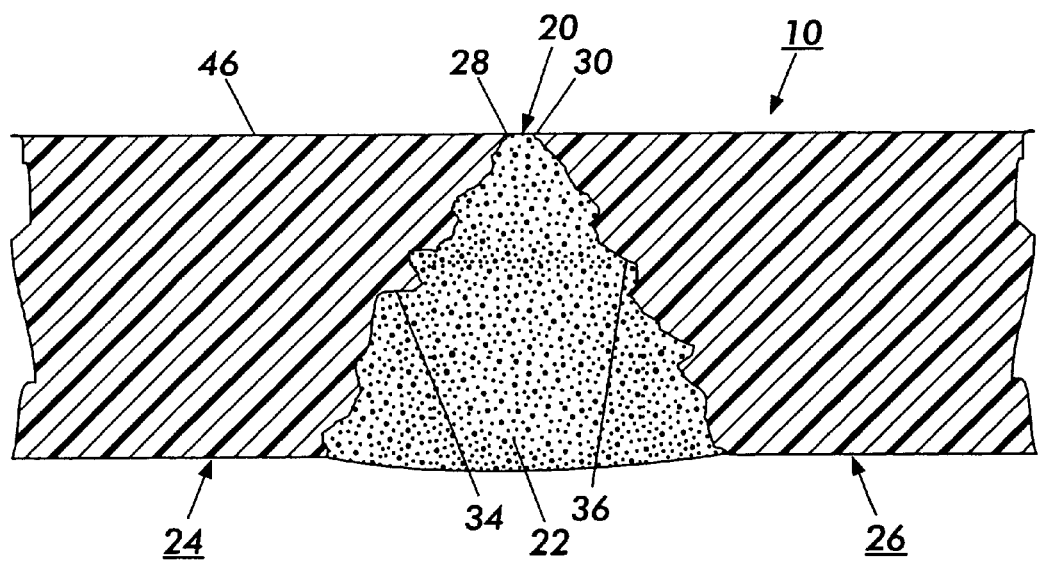
FIG. 6 shows a perspective view of the structure of FIG. 5 after the V-shaped channel is filled with adhesive.

Turning now to FIG. 6, the V-shaped channel 32 and the kerf 20 are filled with the adhesive 22. The area of the sides 34 and 36 is greater than if the sides were perpendicular to the surface of the substrate. This tends to increase the adhesive bond between the ends 28 and 30 of the substrate layer 10. Furthermore, the V-shaped channel reduces the difficulty of filling the seam 11 with adhesive. One good way to fill the seam is to place the surface 46 on top of a flat surface having acceptable adhesive release properties (this surface might even be a piece of tape). Bring the bevel points 28 and 30 together and fill the V-shaped channel 32 with the adhesive 22. Cure the adhesive and then invert the resulting belt. Overflow from the V-shaped channel can then be smoothed, sanded, milled, buffed, and/or polished to an acceptable level. This procedure tends to produce a smooth, flat kerf.

Prior art puzzle-cut seamed intermediate transfer belts were usually fabricated from a blank, planar sheet of suitable belt material that was puzzle-cut, one end at a time, using an intricate and expensive mechanical puzzle-cutting die that extends across the width of the belt. This requires the belt blank to be aligned twice with the elongated die. After cutting, the ends are mechanically aligned, the puzzle-features interlocked to form a mechanically coupled seam, and a suitable adhesive is applied to the seam and cured to form a seamed belt. It is possible to modify this prior art process to produce 3-dimensional seam structures, for example by including cutting, etching, grinding, or milling steps before interlocking the seam. However, the resulting process is slow, labor intensive, and rather unsuitable for large scale, low cost manufacturing. A second prior art puzzle-cut seamed intermediate transfer belt fabrication process uses a laser to simultaneously cut two edges of a continuously fed web of suitable material. However, that process is not suitable for producing 3-dimensional features.

Figure 7:
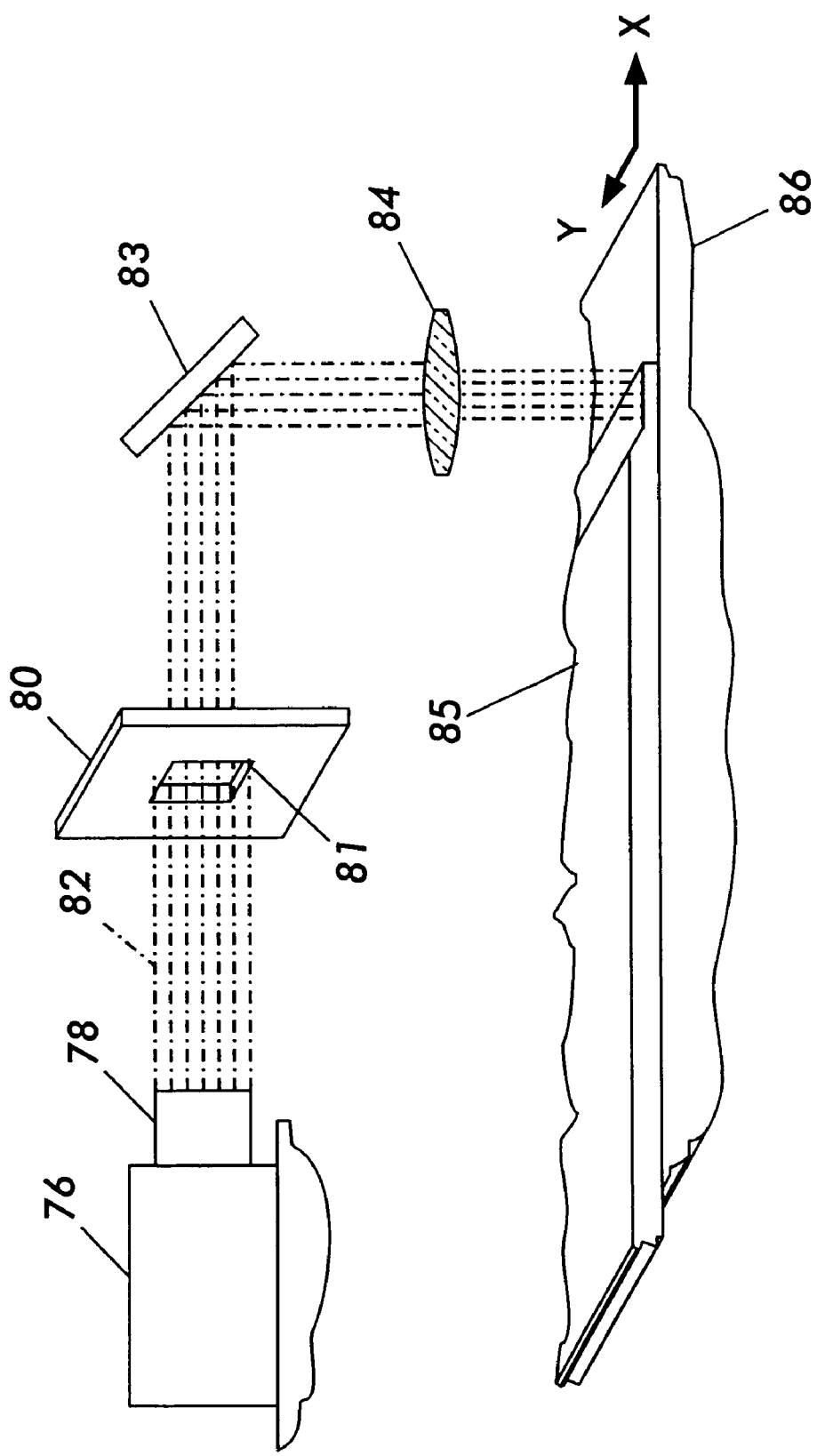
FIG. 7 shows a perspective, schematic view of a laser micro-machining system that is suitable for producing the puzzle-cut seam structure of FIGS. 1–6.

One relatively simple, low cost process for continuous manufacture of puzzle-cut belts according to the principles of the present invention is laser micro-machining. FIG. 7 shows a perspective, schematic view of a suitable laser micro-machining system.

As shown in FIG. 7, a fixed laser 76 having beam-spreading optics 78 illuminates a quartz glass mirrored surface 80 (or thin metal mask) bearing a mask 81 having a desired cutting pattern with a laser beam 82. The laser beam 82 passes through the mask only in the desired cutting pattern, specifically the shape and edges required to form the ends 24 and 26. Typically, the mask features are 2–10 times larger than the actual desired cutting pattern. For convenience, a mirror 83 directs the laser beam along a desired path. A focusing and de-magnification lens 84 is appropriately positioned in the desired path between the mask 81 and a belt substrate 85 that is being micro-machined. The lens 84 appropriately de-magnifies the cutting pattern such that the desired features are cut into the belt substrate. The mask pattern causes the belt substrate to be illuminated as required to produce the sides 34 and 36. Those steps are then continuously cut across the width of the belt by moving the belt material using a vacuum stage X-Y platform 86, or by using some other suitable apparatus.

As will be readily understood by those skilled in the appropriate arts, the optimum laser system, energy density, and/or pulse repetition rates will depend upon the particular application. Significant variables include the particular belt material and its thickness, the required cutting/milling rate, the belt material motion, and the required feature accuracy. However, to provide a starting point, an ultraviolet (UV) laser having a wavelength of 248 nm or 192 nm will generally be suitable for cutting belts of polyaniline and carbon-black filled polyimide substrates, including those having polyanaline and or zeloc filled polyimide films. Suitable lasers include Excimer and triple frequency multiplied YAG lasers (which are believed capable of effectively producing suitable UV frequencies).

Figure 8:
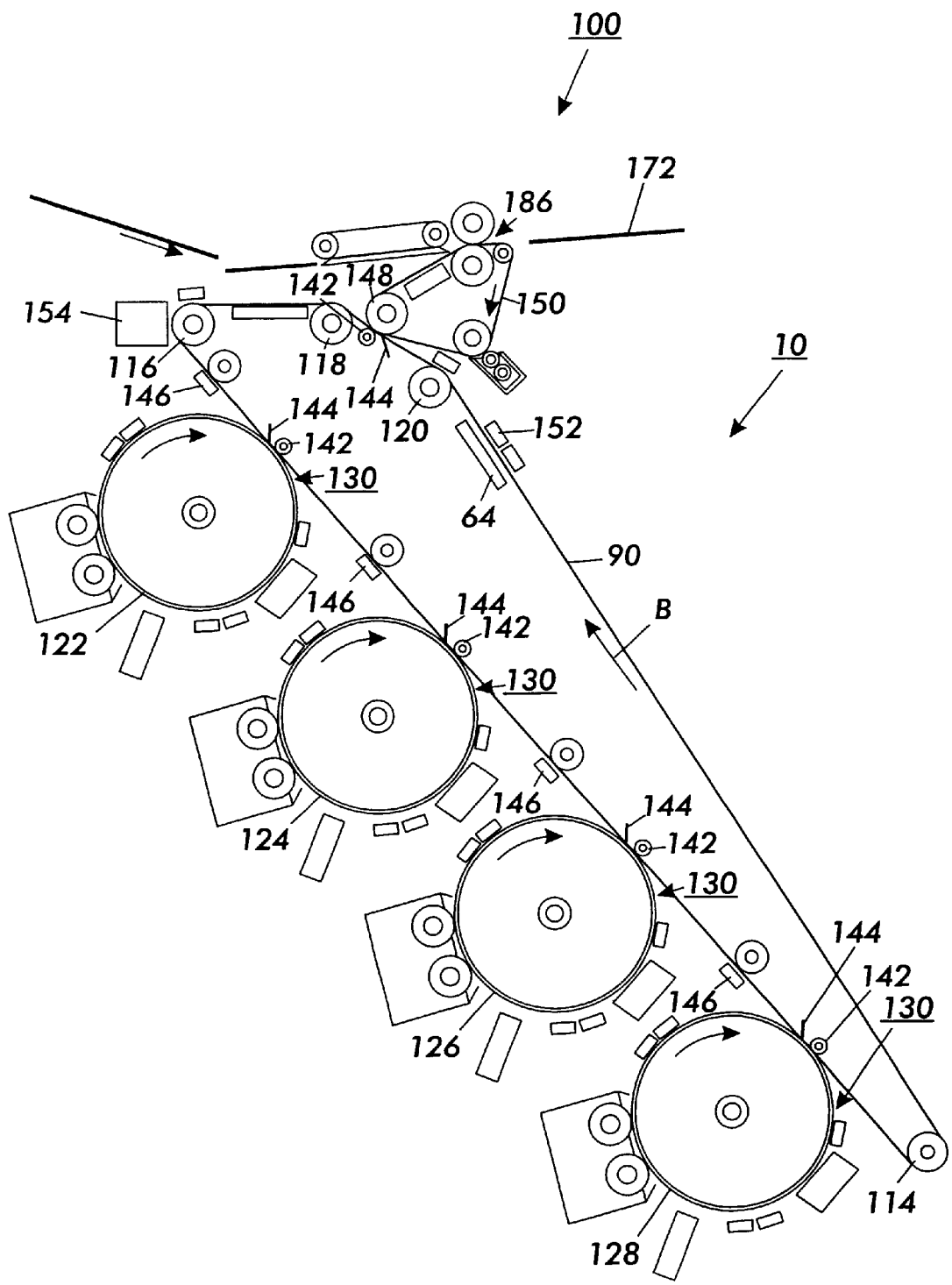
FIG. 8 illustrates an electrophotographic marking machine that includes a puzzle-cut seamed intermediate transfer belt that is in accord FIGS. 1 through 6.
Figure 9:
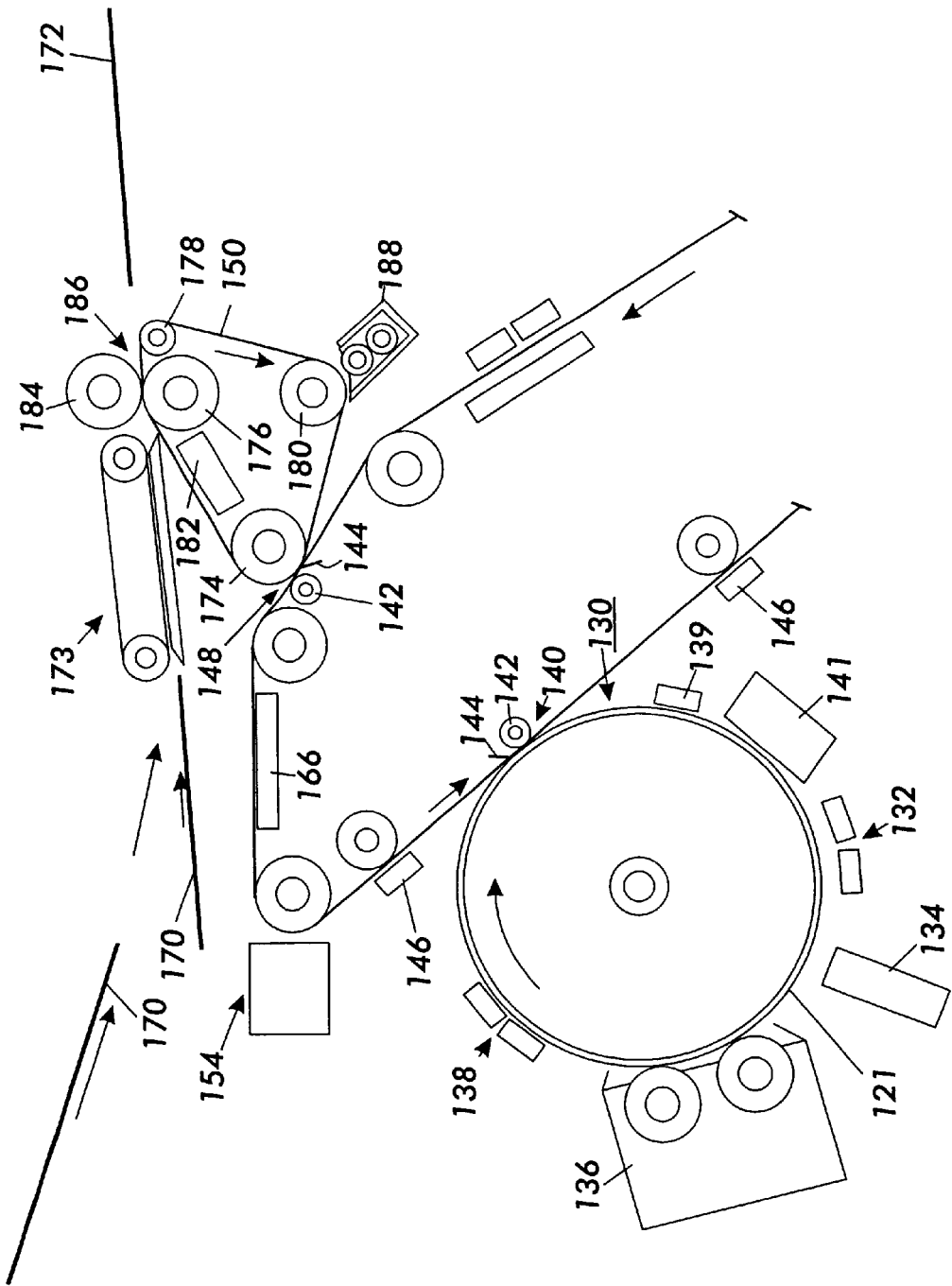
FIG. 9 is an enlarged depiction of part of the marking machine of FIG. 8.

An electrophotographic marking machine 100 that makes beneficial use of imageable seam intermediate transfer belts according to the principles of the present invention is illustrated in FIGS. 8 and 9. With reference to those figures the electrostatographic printer 100 includes an imageable seam intermediate transfer belt 90 that is driven over guide rollers 114, 116, 118, and 120. The imageable seam intermediate transfer belt 90 is formed in accord with FIGS. 1–6. That belt moves in a process direction shown by the arrow B. For purposes of discussion, the imageable seam intermediate transfer belt includes sections that will be referred to as toner areas. A toner area is that part of the intermediate transfer belt that receives actions from the various stations positioned around the imageable seam intermediate transfer belt. While the imageable seam intermediate transfer belt may have multiple toner areas each toner area is processed in the same way.

A toner area is moved past a set of four toner image stations 122, 124, 126, and 128. Each toner image station operates to place a unique color toner image on the toner image of the imageable seam intermediate transfer belt 90. Each toner image producing station operates in the same manner to form developed toner image for transfer to the imageable seam intermediate transfer belt.

While the image producing stations 122, 124, 126, 128 are described in terms of photoreceptive systems, they may also be ionographic systems or other marking systems that form developed toner images. Each toner image producing station 122, 124, 126, 128 has an image bearing member 130. The image bearing member 130 is a drum supporting a photo-receptor 121 (see FIG. 9).

Turn now to FIG. 9, which shows an exemplary toner image producing station. That image bearing station generically represents each of the toner image producing station 122, 124, 126, 128. As shown, the photoreceptor 121 is uniformly charged at a charging station 132. The charging station is of well-known construction, having charge generation devices such as corotrons or scorotrons for distribution of an even charge on the surface of the image bearing member. An exposure station 134 exposes the charged photoreceptor 121 in an image-wise fashion to form an electrostatic latent image on an image area. The image area is that part of the image bearing member which receives the various processes by the stations positioned around the image bearing member 130. The image bearing member may have multiple image areas; however, each image area is processed in the same way.

The exposure station 134 preferably has a laser emitting a modulated laser beam. The exposure station then raster scans the modulated laser beam onto the charged image area. The exposure station 134 can alternately employ LED arrays or other arrangements known in the art to generate a light image representation that is projected onto the image area of the photoreceptor 121. The exposure station 134 exposes a light image representation of one color component of a composite color image onto the image area to form a first electrostatic latent image. Each of the toner image producing stations 122, 124, 126, 128 will form an electrostatic latent image corresponding to a particular color component of a composite color image.

The exposed image area is then advanced to a development station 136. The developer station 136 has a developer corresponding to the color component of the composite color image. Typically, therefore, individual toner image producing stations 122, 124, 126, and 128 will individually develop the cyan, magenta, yellow, and black that make up a typical composite color image. Additional toner image producing stations can be provided for additional or alternate colors including highlight colors or other custom colors. Therefore, each of the toner image producing stations 122, 124, 126, 128 develops a component toner image for transfer to the toner area of the imageable seam intermediate transfer belt 90. The developer station 136 preferably develops the latent image with a charged dry toner powder to form the developed component toner image. The developer can employ a magnetic toner brush or other well-known development arrangements.

The image area having the component toner image then advances to the pretransfer station 138. The pretransfer station 138 preferably has a pretransfer charging device to charge the component toner image and to achieve some leveling of the surface voltage above the photoreceptor 121 to improve transfer of the component image from the image bearing member 130 to the imageable seamed intermediate transfer member 90. Alternatively the pretransfer station 138 can use a pretransfer light to level the surface voltage above the photoreceptor 121. Furthermore, this can be used in cooperation with a pretransfer charging device.

The image area then advances to a transfer nip 140 defined between the image bearing member 130 and the imageable seam intermediate transfer belt 90. The image bearing member 130 and imageable seam intermediate transfer belt are synchronized such that each has substantially the same linear velocity at the first transfer nip 140. The component toner image is then electrostatically transferred from the image bearing member 130 to the imageable seam intermediate transfer belt by use of a field generation station 142. The field generation station 142 is preferably a bias roller that is electrically biased to create sufficient electrostatic fields of a polarity opposite that of the component toner image to thereby transfer the component toner image to the imageable seam intermediate transfer belt. Alternatively the field generation station can be a corona device or other various types of field generation systems known in the art. A prenip transfer blade 144 mechanically biases the imageable seam intermediate transfer belt 90 against the image bearing member 130 for improved transfer of the component toner image.

After transfer of the component toner image, the image bearing member 130 then continues to move the image area past a preclean station 139. The preclean station employs a pre clean corotron to condition the toner charge and the charge of the photoreceptor 121 to enable improved cleaning of the image area. The image area then further advances to a cleaning station 141. The cleaning station 141 removes the residual toner or debris from the image area. The cleaning station 141 preferably has blades to wipe the residual toner particles from the image area. Alternately the cleaning station 141 can employ an electrostatic brush cleaner or other well-know cleaning systems. The operation of the cleaning station 141 completes the toner image production for each of the toner image producing stations.

Turning back to FIG. 8, the individual toner image producing stations 122, 124, 126, and 128 each transfer their toner images onto the imageable seam intermediate transfer belt 90. A first component toner image is advanced onto the imageable seam intermediate transfer belt at the transfer nip of the image producing station 122. Prior to the toner area arriving at that transfer nip the toner area is uniformly charged by a conditioning station 146. This reduces the impact of any stray, low or oppositely charged toner that might result in back transfer of toner into the image producing station 122. Such a conditioning station is positioned before each transfer nip.

The toner images from the individual toner image producing stations 122, 124, 126, and 128 are transferred such that the images are registered. That is, each of the individual color component images are transferred onto the imageable seam intermediate transfer belt 90 such that the human eyes perceives a desired composite color image.

The imageable seam intermediate transfer belt 90 then transports the composite toner image to a pre-transfer charge conditioning station 152 that levels the charges at the toner area of the imageable seam intermediate transfer belt and prepares them for transfer to a transfuse member 150. The pre-transfer charge conditioning station 152 is preferably a scorotron. A second transfer nip 148 is defined between the imageable seam intermediate transfer belt 90 and the transfuse member 150. A field generation station 142 and a pre-transfer nip blade 144 engage the imageable seam intermediate transfer belt and perform similar functions as the field generation stations 142 and pre-transfer blades 144 adjacent the transfer nips 140. The composite toner image is then transferred electrostatically onto the transfuse member 150.

The transfer of the composite toner image at the second transfer nip 148 can be heat assisted if the temperature of the transfuse member 150 is maintained at a sufficiently high optimized level and the temperature of the imageable seam intermediate transfer belt 90 is maintained at a considerably lower optimized level prior to the second transfer nip 148. The mechanism for heat assisted transfer is thought to be softening of the composite toner image during the dwell time of contact of the toner in the second transfer nip 148. This composite toner softening results in increased adhesion of the composite toner image toward the transfuse member 150 at the interface between the composite toner image and the transfuse member. This also results in increased cohesion of the layered toner pile of the composite toner image. The temperature on the imageable seam intermediate transfer belt prior to the second transfer nip 148 needs to be sufficiently low to avoid too high a toner softening and too high a resultant adhesion of the toner to the imageable seam intermediate transfer belt. The temperature of the transfuse member should be considerably higher than the toner softening point prior to the second transfer nip to insure optimum heat assist in the second transfer nip 148. Further, the temperature of the imageable seam intermediate transfer belt 90 just prior to the second transfer nip 148 should be considerably lower than the temperature of the transfuse member 150 for optimum transfer in the second transfer nip 148.

Referring to FIG. 8, the transfuse member 150 is guided in a cyclical path by guide rollers 174, 176, 178, 180. Guide rollers 174, 176 alone or together are preferably heated to thereby heat the transfuse member 150. The imageable seam intermediate transfer belt 90 and transfuse member 150 are preferably synchronized to have the generally same velocity in the transfer nip 148. Additional heating of the transfuse member is provided by a heating station 182. The heating station 182 is preferably formed of infra-red lamps positioned internally to the path defined by the transfuse member 150. The transfuse member 150 and a pressure roller 184 form a third transfer nip 186.

A releasing agent applicator 188 applies a controlled quantity of a releasing material, such as a silicone oil to the surface of the transfuse member 150. The releasing agent serves to assist in release of the composite toner image from the transfuse member 150 in the third transfer nip 186. However, some systems may not use a release material.

The transfuse member 150 preferably has a top most layer formed of a material having a low surface energy, for example silicone elastomer, fluoroelastomers such as Viton™, polytetrafluoroethylene, perfluoralkane, and other fluorinated polymers. The transfuse member 150 will preferably have intermediate layers between the top most and back layers constructed of a Viton™ or silicone with carbon or other conductivity enhancing additives to achieve the desired electrical properties. The back layer is preferably a fabric modified to have the desired electrical properties. Alternatively the back layer can be a metal such as stainless steel.

A substrate 170 is then advanced toward the third transfer nip 186. The substrate 170 is transported and registered by a material feed and registration system into a substrate pre-heater 173. The substrate pre-heater 173 includes a transport belt that moves the substrate 170 over a heated platen. The heated substrate 170 is then directed into the third transfer nip 186.

At the third transfer nip the composite toner image is transferred and fused to the substrate 170 by heat and pressure to form a completed document 172. The document 172 is then directed into a sheet stacker or other well know document handing system (not shown).

A cooling station 166 cools the imageable seam intermediate transfer belt 90 after the second transfer nip 148. A cleaning station 154 engages the imageable seam intermediate transfer belt and removes oil, toner or debris that may be remain onto the imageable seam intermediate transfer belt. The cleaning station 154 is preferably a cleaning blade alone or in combination with an electrostatic brush cleaner, or a cleaning web.

While the foregoing is sufficient to understand the general operation of electrophotographic printing machines that use imageable seam intermediate transfer belts, practical systems are somewhat difficult to achieve. This is because imageable seam intermediate transfer belts that produce acceptable final images, such as the imageable seam intermediate transfer belt 90, are subject to numerous electrical and mechanical constraints, limitations, and design problems. More detailed discussions of those constraints, limitations, and design problems are found in U.S. patent application Ser. No. 09/460,896, entitled "Imageable Seam Intermediate Transfer Belt Having An Overcoat," in U.S. patent application Ser. No. 09/460,821, entitled "Imageable Seam Intermediate Transfer Belt," both filed on Dec. 14, 1999, and in U.S. patent application Ser. No. 09/634,307 entitled "Electrophotographic Marking Machine Having An Imageable Seam Intermediate Transfer Belt," filed on Aug. 8, 2000.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A belt comprising
   a substrate having electrical properties, the substrate also having a puzzle-cut first end and a puzzle-cut second end that are interlocked together to form a seam having a kerf, wherein said first end includes a first beveled side having a first bevel tip, wherein said second end includes a second beveled side having a second bevel tip, wherein said first and second bevel tips are adjacent one another, and wherein said first side and said second side form a substantially V-shaped channel, and
   an adhesive disposed in said channel, wherein the adhesive has electrical properties such that the seam has electrical properties substantially similar to the electrical properties of the substrate.

2. A belt according to claim 1, wherein said adhesive is disposed in said kerf.

3. A belt according to claim 1, wherein said channel is continuous along said seam.

4. A belt according to claim 1, wherein said first end is formed by laser micro-machining.

5. An imageable seamed intermediate transfer belt comprising a seamed semiconductive substrate having a puzzle-cut first end and a puzzle-cut second end that are interlocked together to form a seam having a kerf, wherein said first end includes a first beveled side having a first bevel tip, wherein said second end includes a second beveled side having a second bevel tip, wherein said first and second bevel tips are adjacent one another, and wherein said first side and said second side form a substantially V-shaped channel.

6. An imageable seam intermediate belt according to claim 5, wherein said channel is continuous along said seam.

7. An imageable seam intermediate belt according to claim 5, wherein said first end is formed by laser micro-machining.

8. An imageable seamed intermediate transfer belt according to claim 5, wherein an adhesive is disposed in said channel.

9. An imageable seamed intermediate transfer belt according to claim 8, wherein said adhesive is disposed in said kerf.

10. The belt of claim of claim 8, wherein the adhesive has electrical properties substantially similar to the electrical properties of the substrate.

11. A marking machine, comprising:
    a moving-photoreceptor belt;
    a charging station for charging said photoreceptor belt;
    an imaging station for exposing said charged photoreceptor belt so as to produce a latent image;
    a developer for depositing toner on said latent image;
    a transfer station for transferring said deposited toner onto a substrate, said transfer station including an intermediate transfer belt that receives toner from said charging station;

a fuser having a fusing member for receiving toner from said intermediate transfer belt and for fusing said transferred toner to said substrate; and a cleaning station for cleaning said photoreceptor;

wherein said intermediate transfer belt comprises a seamed semiconductive substrate having a puzzle-cut first end and a puzzle-cut second end that are interlocked together along a kerf so as to form a seam, wherein said first end includes a first beveled side having a first bevel tip, wherein said second end includes a second beveled side having a second bevel tip, wherein said first and second bevel tips are adjacent one another, and wherein said first side and said second side form a substantially V-shaped channel.

12. The marking machine of claim 11, wherein an adhesive is disposed in said V-shaped channel.

13. The marking machine of claim 12, wherein said adhesive is disposed in said kerf.

14. The belt of claim 12, wherein the adhesive has electrical properties substantially similar to the electrical properties of the substrate.

15. The marking machine of claim 11, wherein said V-shaped channel is continuous along said seam.

16. The marking machine of claim 11, wherein said first side is formed by laser micro-machining.

* * * * *